United States Patent [19]

Akin, Jr. et al.

[11] 4,248,496
[45] Feb. 3, 1981

[54] RIFLESCOPE WITH DATA DISPLAY IN FIELD OF VIEW

[75] Inventors: Alfred A. Akin, Jr., West Covina; Kendall B. Morris, Pasadena, both of Calif.

[73] Assignee: Bausch & Lomb Incorporated, Rochester, N.Y.

[21] Appl. No.: 963,086

[22] Filed: Nov. 22, 1978

[51] Int. Cl.³ .............................................. G02B 27/32
[52] U.S. Cl. ..................................... 350/10; 350/110; 350/112
[58] Field of Search ................... 350/10, 33, 110, 112; 356/242, 251, 252

[56] References Cited

U.S. PATENT DOCUMENTS

| 3,583,300 | 6/1971 | Johnson et al. | 350/110 X |
| 3,675,558 | 7/1972 | Karamoto et al. | 350/33 X |
| 3,684,376 | 8/1972 | Lessard | 350/10 X |
| 3,749,494 | 7/1973 | Hodges | 350/10 X |

Primary Examiner—Paul A. Sacher
Assistant Examiner—Matthew W. Koren
Attorney, Agent, or Firm—Christie, Parker & Hale

[57] ABSTRACT

A riflescope is provided with an auxiliary optical system for forming an internal image of data or information disposed outside of the normal eyepiece field of view. A primary application of the system is to transfer an optical image of a target-range figure marked on an external adjustment knob for viewing at the periphery of the field of view without interference with or cluttering of the target image.

18 Claims, 11 Drawing Figures

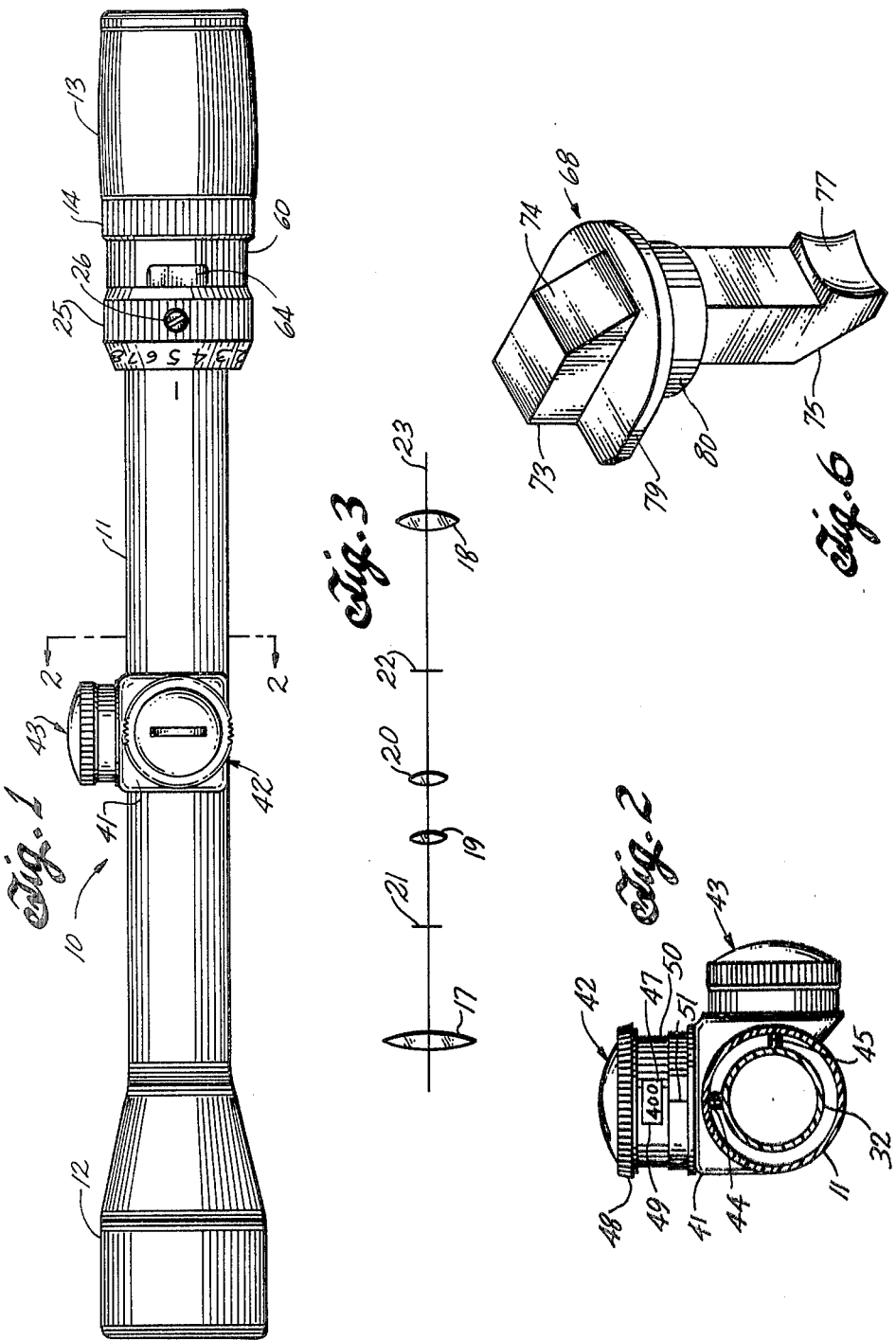

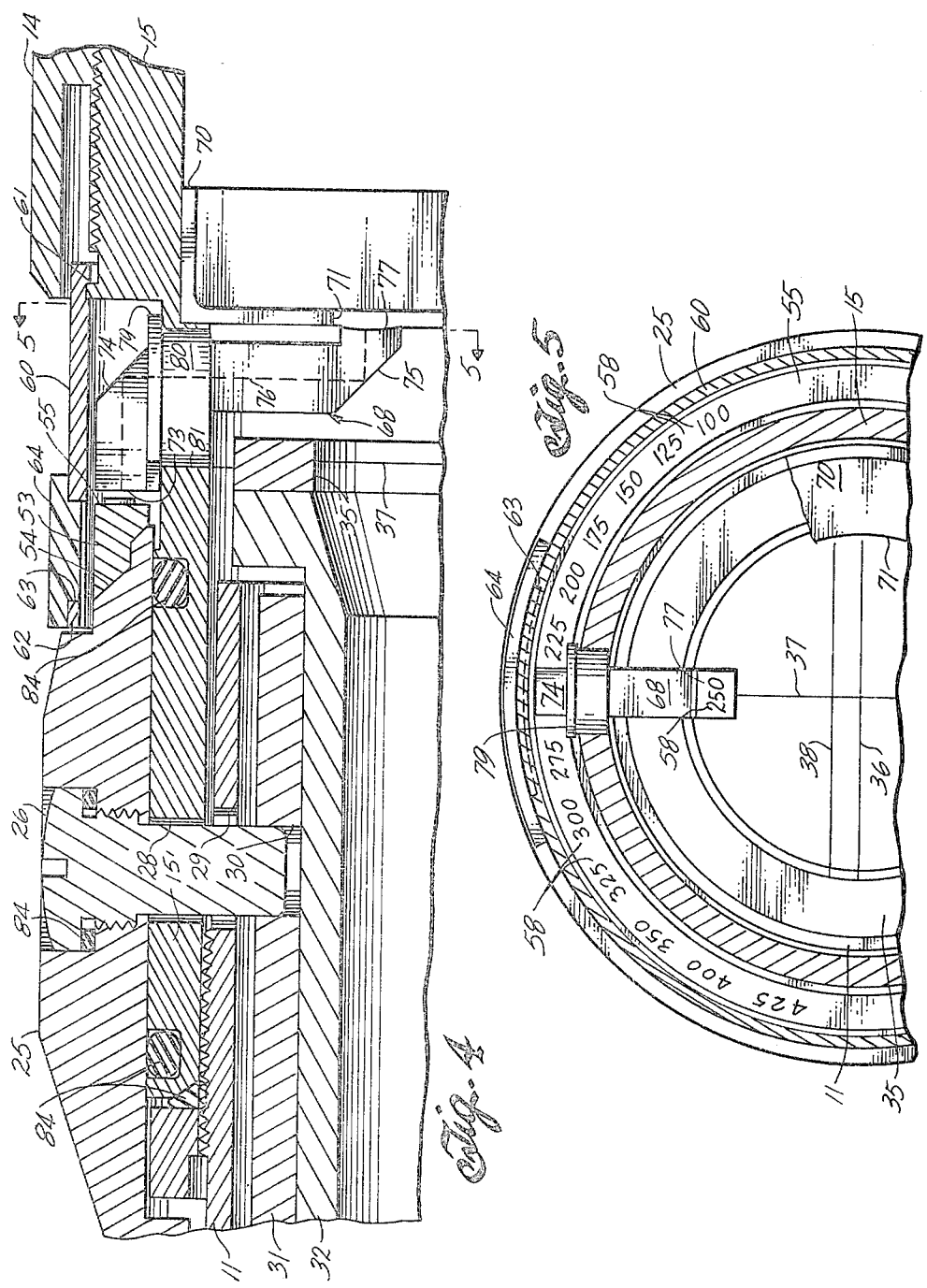

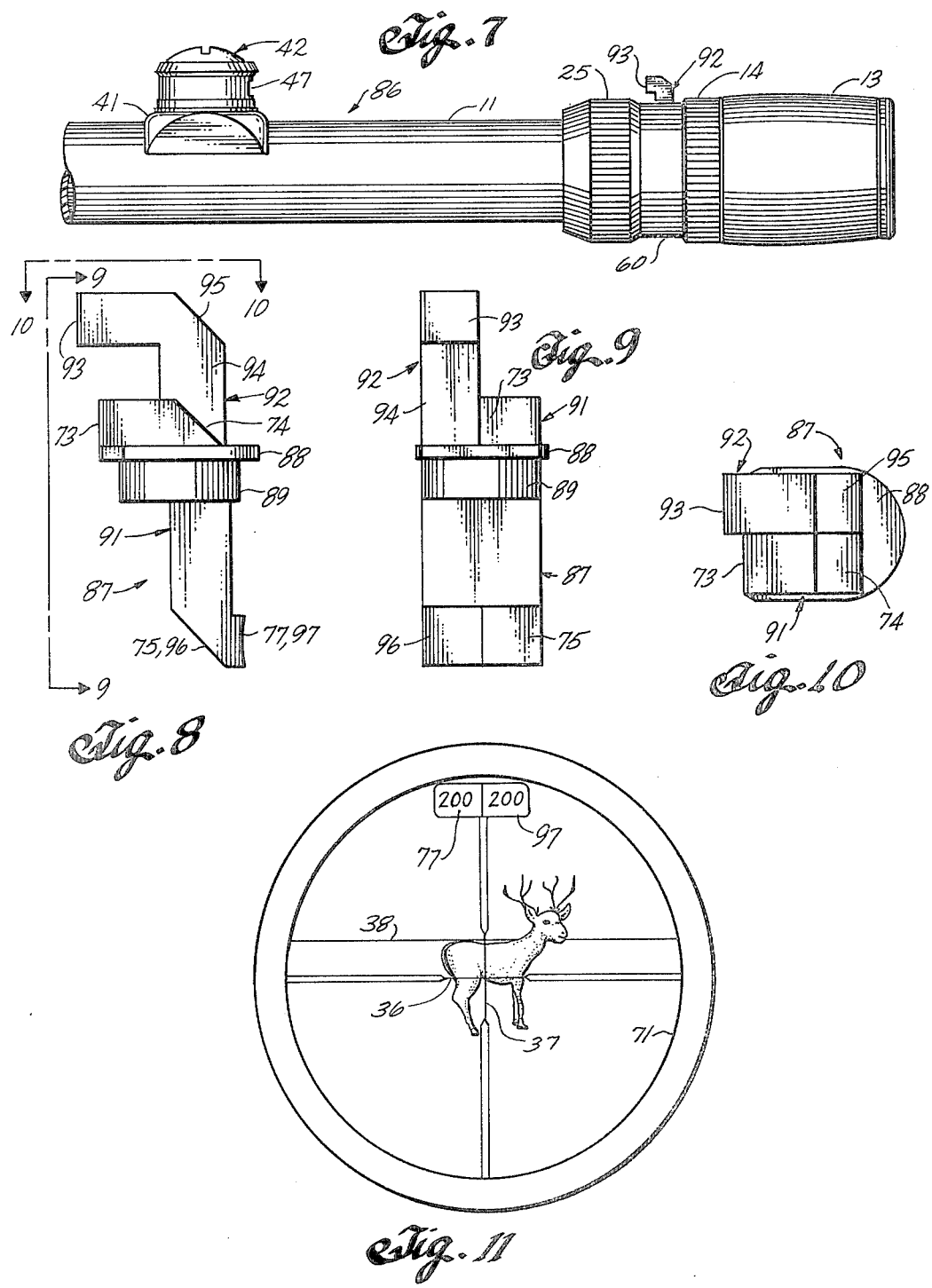

RIFLESCOPE WITH DATA DISPLAY IN FIELD OF VIEW

BACKGROUND OF THE INVENTION

Riflescopes or telescope sights have been commercially available for many years to assist in the accurate aiming of firearms. An instrument of this type has objective and ocular (eyepiece) lenses mounted at opposite ends of an elongated tube, and a system of erecting lenses is positioned between the tube ends to provide an erect target image which is superimposed on a crosshair reticle or other style of aiming reference mark. The optical system may be arranged for either fixed or variable magnification of the target image, but magnification is not essential to the primary function of an optical sight which is to place the aiming reference mark and target image in the same focal plane so the shooter does not have to shift eye focus between the aiming mark and the target.

It is conventional to provide adjustable reticle elements to enable variation of the aiming point both vertically and horizontally (elevation and windage), and this adjustment may involve either movement of the reticle elements or an optical shifting of the target image with respect to the aiming point. After a riflescope is mounted on a rifle, the sight is zeroed by adjusting these controls until the bullet impacts exactly at the aiming point at one specific range. If the target range is thereafter varied from the zeroed range, the shooter must either hold the aiming point over or under the desired impact point, or make an adjustment in the setting of the horizontal elevation reticle to compensate for the arched trajectory of the bullet.

Reticle adjustments in some riflescopes are calibrated in minutes of angle, but several styles of modern riflescopes use elevation reticle adjustments which are calibrated directly in terms of yardage (or any convenient unit of linear measurement) to the target. Preferably, the adjustment is provided with interchangeable range scales for use with different types of ammunition, and a riflescope incorporating this feature is shown in detail in U.S. Pat. No. 3,990,155 the full disclosure of which is incorporated herein by reference.

A few hunters are successful in developing an ability to make accurate visual estimates of target range, but most shooters need the assistance of a rangefinding device to enable accurate aiming. It is recognized in the art that when the height of the target object is known, the height of the target image in the riflescope field of view is related to target range. This geometric relation enables a rangefinding capability to be built into a riflescope by providing a height reference marking (typically the vertical spacing between a pair of horizontal reticle wires) against which the height of the target image is compared.

For example, one of the horizontal reticle wires may be vertically adjustable to enable the target image to be framed between the two horizontal wires. Alternatively, the two horizontal wires may be fixed at a constant vertical spacing, and the power or magnification of the optical system varied to alter the height of the target image until it is framed between the fixed wires. Additional adjustments may be provided to enable calibration of the rangefinder for targets of different heights.

When target distance has been measured, the elevation reticle is adjusted to this range, and the aiming point should then coincide with the impact point. Alternatively, a relatively complex mechanism may be provided to couple the elevation reticle to the rangefinder so the elevation adjustment is made automatically as the range determination is made. Riflescopes of these several different styles are disclosed in U.S. Pat. Nos. 3,123,915, 3,386,330, 3,684,376 and 3,782,822 and a particularly comprehensive discussion is provided in U.S. Pat. No. 3,948,587.

Most hunters prefer a visual display of target range which is easily and quickly inspected to enable estimation of an elevation setting, and to provide a basis for deciding whether the range is within the capabilities of the firearm and hunter. For example, the aforementioned U.S. Pat. Nos. 3,386,330 and 3,684,376 disclose several different arrangements for displaying target range in the eyepiece field of view as the rangefinder adjustment is being made.

"Internal" range displays of this type are convenient in that the shooter does not have to move his head or reposition the firearm to see the target distance measured by the rangefinder. Thses displays, however, tend to clutter and reduce the target field of view, and may interfere with the hunter's ability to capture the target image quickly, and to maintain a clear view of a moving target.

The improvement of this invention relates to an optical system for providing an image within the eyepiece field of view of a scale or object which is physically external to the eyepiece viewfield. The image is radially inward (with respect to an optical axis of the riflescope) of the object which is external to the eyepiece viewfield, and the image occupies only a very small fixed position in the viewfield to avoid interference with the primary target field of view. The invention is discussed in detail below with respect to use in displaying target-range figures, but other types of information which can be similarly displayed are also described.

SUMMARY OF THE INVENTION

Briefly stated, this invention relates to a riflescope improvement which enables transmission of external information (which may be positioned outside a sealed internal volume of the instrument) into the sight optical system for display against the field of view which contains the target image. A periscope or equivalent optical system is supported on the body of the riflescope, and is arranged to transmit light rays from the object to be viewed into the interior of the riflescope for display in only a small portion of the field of view which is preferably a portion of an annular zone adjacent the periphery of the view field. The periscope preferably includes a focusing surface which effectively alters the focal length of the riflescope eyepiece so the periscope-formed image is in sharp focus against the target image.

The invention is particularly useful in displaying target-distance data from a scale on a rangefinder on the riflescope. Multiple periscopes may also be provided to form several images of external information in the field of view. In one form, a dual periscope is used to display both a rangefinder reading and the setting of an elevation adjustment on the riflescope.

BRIEF DESCRIPTION OF THE DRAWINGS

FIG. 1 is a top view of a riflescope incorporating the invention;

FIG. 2 is a view on line 2—2 of FIG. 1;

FIG. 3 is a schematic diagram showing the optical elements used in the riflescope;

FIG. 4 is a sectional elevation of a portion of the riflescope;

FIG. 5 is a view on line 5—5 of FIG. 4;

FIG. 6 is a pictorial view of a periscope used in the riflescope;

FIG. 7 is a side view of a portion of a modified form of the riflescope shown in FIG. 1;

FIG. 8 is a side view of a double-periscope optical element used in the riflescope shown in FIG. 7;

FIG. 9 is a front view on line 9—9 of FIG. 8;

FIG. 10 is a top view on line 10—10 of FIG. 8; and

FIG. 11 shows the target field of view as seen by the shooter through the riflescope shown in FIG. 7.

DESCRIPTION OF THE PREFERRED EMBODIMENTS

FIGS. 1 and 2 show a riflescope 10 having a central mounting-frame system or body tube 11 which supports at its opposite ends an objective-lens housing 12 and an eyepiece or ocular-lens housing 13. As is conventional in riflescopes of this type, the ocular-lens housing is axially movable for focusing purposes, and is secured in any desired position by a locking ring 14. The ocular-lens housing and locking ring are threaded onto a cylindrical connector barrel 15 (FIG. 4) which is in turn threaded onto the rear end of body tube 11 to secure these components in optical alignment.

The optical system of the riflescope is shown in schematic form in FIG. 3. The system includes an objective lens 17 supported in housing 12, an eyepiece or ocular lens 18 supported in housing 13, and a pair of erector lenses 19 and 20 disposed between the objective and ocular lenses, and variably spaced apart to adjust the magnification of the riflescope.

The optical system has a front focal plane 21 disposed between the objective lens and the erector lenses, and a rear focal plane 22 disposed between the erector lenses and the ocular lens. The lenses are aligned along an optical axis 23 which is generally concentric with the axis of body tube 11. The components of the optical system are conventional and may be compound lenses, or include further elements such as a collector lens.

As best seen in FIGS. 1 and 3, a power change ring 25 is rotatably mounted on connector barrel 15 at the rear end of the body tube slightly forward of locking ring 14. A radially extending pin 26 is threaded into an opening in the power change ring through circumferentially extending slots 28 and 29 in the connector barrel and body tube to be received in a mating circular opening 30 in a cam tube 31. The cam tube is in turn rotatably mounted on an erector tube 32 which carries conventional cells (not shown) at its forward end to support erector lenses 19 and 20.

The cam tube and erector tube are coupled together in a conventional and well-known way to enable adjustment of the axial spacing of the erector lenses in response to rotation of the power change ring. This arrangement enables magnification of the target image to be varied over a range of, for example, 3-9 power. For brevity, the coupling mechanism is not here described in detail, but it can be of any conventional type as used in prior-art riflescopes (see, for example, U.S. Pat. No. 3,386,330).

Supported at the rear end of erector tube 32 is an annular reticle frame 35 (FIGS. 4 and 5) on which are mounted horizontal and vertical aiming crosshairs 36 and 37, and a horizontal stadia wire 38 which is spaced slightly above the horizontal crosshair of the aiming reticle. These reticle elements are positioned in rear focal plane 22 of the optical system, and are arranged to be stationary in position against the target field of view. That is, the aiming crosshairs are constantly centered in the field of view, and are unaffected by windage and elevation adjustments, or by variation of the optical-system magnification.

A mounting saddle 41 (FIGS. 1 and 2) is centrally secured to the body tube of the riflescope, and supports an elevation adjustment assembly 42 and a windage adjustment assembly 43. These assemblies include adjustment screws 44 and 45 (FIG. 2) which bear on the forward end of erector tube 32 to enable the forward end of the tube to be moved either horizontal or vertically in a pivoting motion about the rear end of the tube. These motions enable a target image which is focused at rear focal plane 22 to be moved with respect to the stationary aiming crosshair reticle to adjust the windage and elevation setting of the sight.

The elevation adjustment assembly includes a distance scale 47 which is rotated by a knob 48 which also controls the position of screw 44. The distance scale is visible through a window 49 in a tubular housing 50 beneath adjustment knob 48. When the target range is known, the shooter simply sets this known distance in window 49 in alignment with a reference mark 51, and the aiming point of the sight will then correspond with the impact point of the bullet at that distance. This elevation adjustment assembly is described in greater detail in the previously mentioned U.S. Pat. No. 3,990,155.

Although an elevation reticle adjustment of the style just described is preferred, it is not an essential part of the invention which is usable with any other type of target-range adjustments. The described target-range control is preferred because it works nicely in conjunction with an alternative form of the invention as described below. The other riflescope components thus far described are also largely conventional, and other forms of optical systems, magnification adjustments, and the like can be used with the invention.

The various components which constitute the present invention are mostly positioned on the riflescope in the area between power-change ring 25 and ocular-lens housing 13. This portion of the assembly is shown in detail in the sectional views of FIGS. 4 and 5.

Referring to these figures, an annular distance-scale ring 53 is fitted over and secured to the periphery of the rear end of power change ring 25. The distance-scale ring is made of a transparent or translucent light-transmitting plastic material, and a forward end of the ring has a surface 54 which is sloped at an angle of 45 degrees such that light impinging radially on the outer light-gathering surface of the ring is reflected axially rearwardly through the ring.

Preferably, a flat rear surface 55 of the ring is finished with an opaque coating, but clear regions are left in the coating to define a plurality of target-range figures 58. That is, light rays passing through the body of the distance-scale ring are blocked by the opaque coating, but pass through the clear areas to define the target range figures as bright numbers. Alternatively, surface 55 can be clear, and the range figures defined by opaque numerals.

A cylindrical cover ring 60 is fitted over the rear end of connector barrel 15, and is secured against forward axial movement by a shoulder 61. A forward end 62 of the cover ring extends over the rear peripheral surface of the power-change ring, and a generally rectangular slot 63 is formed through the upper surface of the ring at the top of the riflescope. A transparent window 64 of a light-transmitting plastic material is fitted into the slot and secured to the cover ring by cementing or any convenient means. The window may be frosted to diffuse the incoming ambient light.

A periscope 68 (FIGS. 4, 5 and 6) is supported on connector barrel 15, and is operative to transmit an image of a target range figure 58 into the riflescope field of view. The view field is defined by field stop 70 secured inside the connector barrel and having a central circular opening 71.

The term "periscope," as used in this description, is defined as any optical means having a sighting end for receiving incident light rays from an object, the object and sighting end being on a sighting axis, and changing the direction of propagation of the light rays to enable formation of an image on a viewing axis which is not on the sighting axis. This optical function can be performed with mirror systems, fiber optics, and by other known techniques, but a preferred form of periscope as shown in the drawings is an integrally molded unitary plastic element which functions as a prism system to deflect incident light rays radially inwardly toward the optical axis of the riflescope, and then axially toward the ocular lens.

Periscope 68, as shown in the drawings, has a planar front face 73 which receives incoming light energy. An upper rear surface 74 at the top of the periscope body is sloped at an angle of 45 degrees to form a prism with the property of substantially total internal reflection. A lower forward surface 75 at the inner or lower end of the periscope body is also sloped at 45 degrees to form a second prism with the property of substantially total internal reflection. The path of a light ray which is perpendicularly incident on front face 73 is shown by phantom line 76 in FIG. 4, and it is seen that the light ray is deflected through two 90-degree reflections to emerge at a rear face 77 at the lower and inner end of the periscope. Rear face 77 is positioned at the top of the riflescope field of view just within circular opening 71 of field stop 70.

For mounting purposes, the periscope includes an upper flange 79 positioned immediately below prism surface 74. The under-surface of flange 79 defines a downwardly extending cylindrical portion 80 which makes a snug fit in a cylindrical bore 81 (FIG. 4) formed through the top surface of connector barrel 15. Flange 79 limits the inward movement of the periscope with respect to the connector barrel, and provides a surface which can be cemented directly to the connector barrel to secure the periscope in place.

It is desirable that the target range figure displayed at rear face 77 of the periscope be in sharp focus when viewed through the ocular lens of the riflescope. The surface which defines the target range figure, however, may be physically displaced from the rear focal plane of the optical system, and a focal-length correction will sometimes be needed to insure that the periscope-formed image is crisp and easily read.

To restore the target range figure to sharp focus when viewed through the ocular lens, rear face 77 of the periscope is polished to define a concave surface which gives the periscope a slight negative power. In effect, this lens surface of the periscope alters the focal length of the total eyepiece and periscope system such that the range-figure image is seen in sharp focus through the ocular lens and superimposed on the riflescope field of view which includes the target image. A lens surface to effect this focal-length correction can also be formed on another surface of the periscope, or can be formed on a separate optical element in the overall system.

As is conventional in commercially available riflescopes, O-ring seals 84 (FIG. 4) are used throughout the instrument to insure that the interior volume of the instrument is thoroughly sealed against intrusion of moisture or particulate matter. The cemented connection of the periscope to the connector barrel preserves this sealing of the internal volume of the riflescope, but permits light rays to be transmitted radially inwardly from the unsealed outer portion of the riflescope into the sealed inner volume which contains the field of view as defined by the field stop. The periscope thus provides an optical means for conveying target-range figures or other data displayed on the outside of the riflescope into the sealed interior of the device.

In operation, the shooter first determines target range by varying the magnification of the riflescope with power change ring 25 until the body of the target image is precisely framed between horizontal crosshair 36 and stadia wire 38 as suggested in FIG. 11. The positioning and spacing of target range figures 58 on distance-scale ring 53 which is fixed to the power change ring are calibrated so the figure representing actual target range is rotated immediately in front of front face 73 of the periscope when the framing adjustment is complete.

For any specific spacing of the horizontal crosshair and stadia wire, this calibration will be accurate for one specific animal size. However, and as suggested in the prior-art patents previously mentioned, a variety of "stepped" reticle patterns can be provided to accommodate game animals of different sizes. Alternatively, cover ring 60 can be arranged to slide rearwardly along the connector barrel to enable a split distance-scale ring to be removed and replaced with another ring which is calibrated for an animal of a different size. Another alternative is to provide multiple target-range scales on the power change ring for different animal sizes, and to provide a means for selecting the desired scale for display in the field of view.

Ambient light transmitted through window 64 illuminates the distance-scale ring and this light energy is reflected through the ring to illuminate the target range figure which is beneath the window and immediately in front of the front face of the periscope. This light energy is transmitted through the periscope and focused by the negative lens at the rear face of the periscope and the ocular lens to be presented as a sharp numerical display at the upper edge of the field of view as shown in FIG. 5. The hunter can thus immediately determine whether the target is at a feasible shooting range, and the displayed range figure is then set on distance scale 47 of the elevation adjustment assembly. The riflescope is thus quickly and easily zeroed at the desired target range so the hunter can hold "dead on" the desired impact point.

The invention is not limited to the projection or transmission of distance figures on the power change ring, and the periscope is equally useful for transmitting other information which is physically displayed outside the sealed volume of the riflescope. For example, the periscope can be arranged to view a parallax scale on the objective lens housing, or to provide an image of the position of a mechanical device such as a safety on the rifle. It is also entirely feasible to provide dual periscopes for presenting images of several different types of information against the riflescope field of view.

A dual-image riflescope 86 of this type is shown in FIG. 7, and this instrument uses a double periscope 87 as shown in FIGS. 8-10. Double periscope 87 is in some respects similar to periscope 68 in that it incorporates the same general style of an upper flange 88 and cylindrical portion 89 which enable the periscope to be secured to the riflescope connector barrel. Periscope 87, however, incorporates two separate periscopic optical systems enabling two different external objects to be viewed against the field of view as seen through the ocular lens.

A first periscope 91 has surfaces which are identical to those used in periscope 68, and corresponding numerals are accordingly used in FIGS. 8-10. A second periscope 92 has a front face 93 which is positioned substantially above the corresponding front face of the first periscope by an elongated radially extending body portion 94. The second periscope includes a pair of 45-degree surfaces 95 and 96 to provide the total internal reflection properties described above, and light rays emerge from the system at a rear face 97 which is positioned alongside the rear face of the first periscope. Rear face 97 is appropriately contoured, typically as a negative lens, to adjust the overall focal length of the system to insure that the object being viewed will be in sharp focus against the target image as seen through the eyepiece.

As shown in FIG. 7, the second periscope extends through an opening in cover ring 60 to position front face 93 radially beyond the periphery of power change ring 25. This arrangement enables the second periscope to have a direct view of the reading on distance-scale ring 53 of elevation adjustment assembly 42. The appearance of the rear faces of the two periscopes as seen by the shooter through the eyepiece of the riflescope is shown in FIG. 11, with the measured target-range figure shown at the left, and the elevation adjustment assembly shown at the right. Any deviation between the two figures is immediately noted by the shooter, and an appropriate correction can be quickly made simply by adjusting the position of knob 48 of the elevation adjustment assembly.

There has been described a periscopic optical system for conveying information from surfaces outside the sealed internal volume of a riflescope to be visually presented against the target field of view of the instrument. A particular advantage of the invention is that the internal information image occupies only a small part of the total field of view, and does not clutter or block the hunter's view of the target. As previously mentioned, other styles of periscopic systems can be used to provide a radially inward offset of an image of the object seen through the periscope, but the invention has been described in a presently preferred form which is economical to manufacture, and which is sufficiently flexible to be adapted to the transmission of a variety of different types of external information.

I claim:

1. In a riflescope for sighting a firearm on a target and having an ocular lens with a field of view which includes a focal plane on which a target image can be formed, the improvement comprising an adjustable rangefinder control mounted on the riflescope and having a range scale of figures indicative of target distance, the scale being physically outside the ocular-lens view field to avoid interference with and reduction of the view field, and a scale-viewing optical system mounted on the riflescope and arranged to transmit light from the scale into the ocular-lens field of view to provide an image of a range-scale figure, the figure image being viewable through the ocular lens with the target image and being positioned in only a portion of an annular zone adjacent the periphery of the view field, substantially all of the remainder of the annular zone providing an unobstructed view of the target and surrounding area.

2. The improvement defined in claim 1, wherein the scale-viewing optical system is arranged to form the image of the range-scale figure adjacent the top of the field of view.

3. The improvement defined in claim 1, wherein the rangefinder control includes a light-transmitting member external to the ocular-lens view field and configured to direct light toward the scale-viewing optical system, the figures of the range scale being formed on a surface of the light-transmitting member which faces the optical system.

4. The improvement defined in claim 1, wherein the scale-viewing optical system includes means for compensating the focal length of the ocular lens so the range-scale figure is in sharp focus in the field of view when the length of an optical path from the ocular lens to the range scale does not correspond to the normal focal length of the ocular lens.

5. The improvement defined in claim 1, wherein the riflescope has a sealed internal volume which includes the field of view, and the range scale is outside of the internal volume, the scale-viewing optical system being configured to convey the image of the range-scale figure into the internal volume.

6. In a riflescope having a mounting system supporting ocular, objective and erecting lenses on an optical axis, a rangefinding reticle at a focal plane of the ocular lens, and a power change adjustment for varying magnification of a target image in a field of view at the focal plane, the power change adjustment controlling position of a range scale of figures indicative of target distance, the scale being outside and unobstructive of the field of view, the improvement comprising:

an optical periscope supported on the mounting system and having a first end positioned adjacent the range scale, a second end positioned within the mounting system in the field of view and facing the ocular lens, and an intermediate portion extending generally radially of the optical axis between the first and second ends, whereby an image of a figure on the range scale can be viewed in the riflescope field of view, the periscope second end being positioned in only a portion of an annular zone of the field of view, the remainder of the annular zone providing a substantially unobstructed view of the target and surrounding area.

7. The improvement defined in claim 6, wherein the periscope includes a lens surface for adjusting the focal length of the combined ocular lens and periscope optical system so the range-scale figure will be in focus when viewed through the ocular lens.

8. The improvement defined in claim 7, wherein the lens surface is formed as a negative lens at the second end of the periscope.

9. The improvement defined in claim 6, wherein the power change adjustment includes a light-transmitting ring having a light-gathering surface extending generally parallel to the optical axis, and a second surface bearing the range-scale figures and extending generally perpendicularly to the optical axis.

10. The improvement defined in claim 9, wherein the ring includes an internal reflecting surface for redirecting incident light toward the second surface.

11. The improvement defined in claim 10, and further comprising a cover ring supported on the riflescope and extending over the light-transmitting ring, the cover ring including a light-transmitting window positioned to illuminate at least a portion of the range scale.

12. The improvement defined in claim 11, wherein the periscope is formed as a unitary light-transmitting member with a lens surface for adjusting the focal length of the combined ocular lens and periscope system so the range-scale figure will be in focus when viewed through the ocular lens.

13. A riflescope comprising:
a generally tubular mounting means;
an optical system supported on the mounting means and including spaced-apart ocular and objective lenses and an image-erecting system disposed in an enclosed space between the ocular and objective lenses; and
a unitary light-transmitting periscope supported on the mounting means and having a first end which is external to the enclosed space and oriented to view a selected object external to the enclosed space, the periscope further having a second end positioned within the enclosed space between the ocular lens and image-erecting system for forming an image of the object which can be viewed through the ocular lens.

14. The riflescope defined in claim 13, wherein the unitary periscope includes a lens surface for altering the effective focal length of the ocular lens to compensate for any difference between the normal ocular-lens focal length and an optical path length between the ocular lens and the object being viewed through the periscope.

15. The riflescope defined in claim 14, wherein the enclosed space is substantially sealed, and further comprising a rangefinder on the riflescope and having a scale of target-distance figures, the periscope second end being positioned to view a selected figure which is indicative of determined target range.

16. The riflescope defined in claim 15, wherein the scale of target-distance figures is displayed on a power change ring on the riflescope and operative to vary the magnification of the optical system.

17. The riflescope defined in claim 13, wherein the periscope includes a plurality of first and second ends to provide plural internal images of plural external objects.

18. The riflescope defined in claim 17, wherein the riflescope includes an elevation adjustment assembly with a distance scale, one of the first periscope ends being positioned to view the distance scale, the riflescope further having a rangefinder with a scale of target-distance figures with another of the periscope first ends being positioned to view the rangefinder scale, the periscope second ends being adjacent to provide a side-by-side display of figures on the elevation-adjustment-assembly scale and the rangefinder scale.

* * * * *